(12) United States Patent
Ryu et al.

(10) Patent No.: US 8,537,208 B2
(45) Date of Patent: Sep. 17, 2013

(54) APPARATUS AND METHOD FOR DISPLAYING THREE-DIMENSIONAL IMAGE ACCORDING TO POSITION OF USER

(75) Inventors: Hee-seob Ryu, Suwon-si (KR); Tae-hee Kim, Suwon-si (KR); Soo-hyun Bae, Seoul (KR); Jun-il Sohn, Yongin-si (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1554 days.

(21) Appl. No.: 11/590,876

(22) Filed: Nov. 1, 2006

(65) Prior Publication Data

US 2007/0165037 A1   Jul. 19, 2007

(30) Foreign Application Priority Data

Dec. 19, 2005  (KR) .................. 10-2005-0125818

(51) Int. Cl.
*H04N 9/47* (2006.01)
(52) U.S. Cl.
USPC .......................................... 348/59
(58) Field of Classification Search
USPC .......................................... 348/59
See application file for complete search history.

(56) References Cited

U.S. PATENT DOCUMENTS

| 6,075,557 | A  | * | 6/2000  | Holliman et al. ............... 348/51 |
| 6,950,078 | B2 | * | 9/2005  | Suyama et al. ................... 345/6 |
| 7,495,634 | B2 | * | 2/2009  | Takagi et al. ..................... 345/6 |
| 2005/0275942 | A1 | * | 12/2005 | Hartkop et al. ............... 359/464 |

FOREIGN PATENT DOCUMENTS

| JP | 11-113028  | 4/1999 |
| KR | 2004-26693 | 3/2004 |
| KR | 2005-4823  | 1/2005 |
| KR | 2005-21973 | 3/2005 |

* cited by examiner

*Primary Examiner* — David Czekaj
*Assistant Examiner* — Tracy Li
(74) *Attorney, Agent, or Firm* — Staas & Halsey LLP

(57) ABSTRACT

An apparatus and method for displaying a three-dimensional image according to the position of a user, in which the distance between a display panel displaying a two-dimensional image and a three-dimensional optical panel converting a two-dimensional image into a three-dimensional image is controlled in accordance with the position of the user to provide an optimized three-dimensional image. The apparatus includes a three-dimensional optical device converting a displayed two-dimensional image into a three-dimensional image, a position measurement module measuring the position of the user who converges on the three-dimensional image, a crosstalk calculator calculating the level of crosstalk that can occur in the position of the user, and a driver adjusting a position of the three-dimensional optical device if the level of crosstalk exceeds a predetermined threshold value.

16 Claims, 5 Drawing Sheets

FIG. 4

| SIZE AND PIXEL PITCH OF DISPLAY DEVICE | 15 inch, 0.261mm | | | | |
|---|---|---|---|---|---|
| DISTANCE D BETWEEN DISPLAY DEVICE AND USER | 400mm | 500mm | 600mm | 700mm | 800mm |
| DISTANCE G BETWEEN DISPLAY DEVICE AND THREE-DIMENSIONAL OPTICAL DEVICE | 1.6mm | 2.0mm | 2.4mm | 2.8mm | 3.2mm |

~ 410

| SIZE AND PIXEL PITCH OF DISPLAY DEVICE | 55 inch, 0.81mm | | | | |
|---|---|---|---|---|---|
| DISTANCE D BETWEEN DISPLAY DEVICE AND USER | 1000mm | 1500mm | 2000mm | 2500mm | 3000mm |
| DISTANCE G BETWEEN DISPLAY DEVICE AND THREE-DIMENSIONAL OPTICAL DEVICE | 12.308mm | 18.462mm | 24.616mm | 30.770mm | 36.924mm |

~ 420

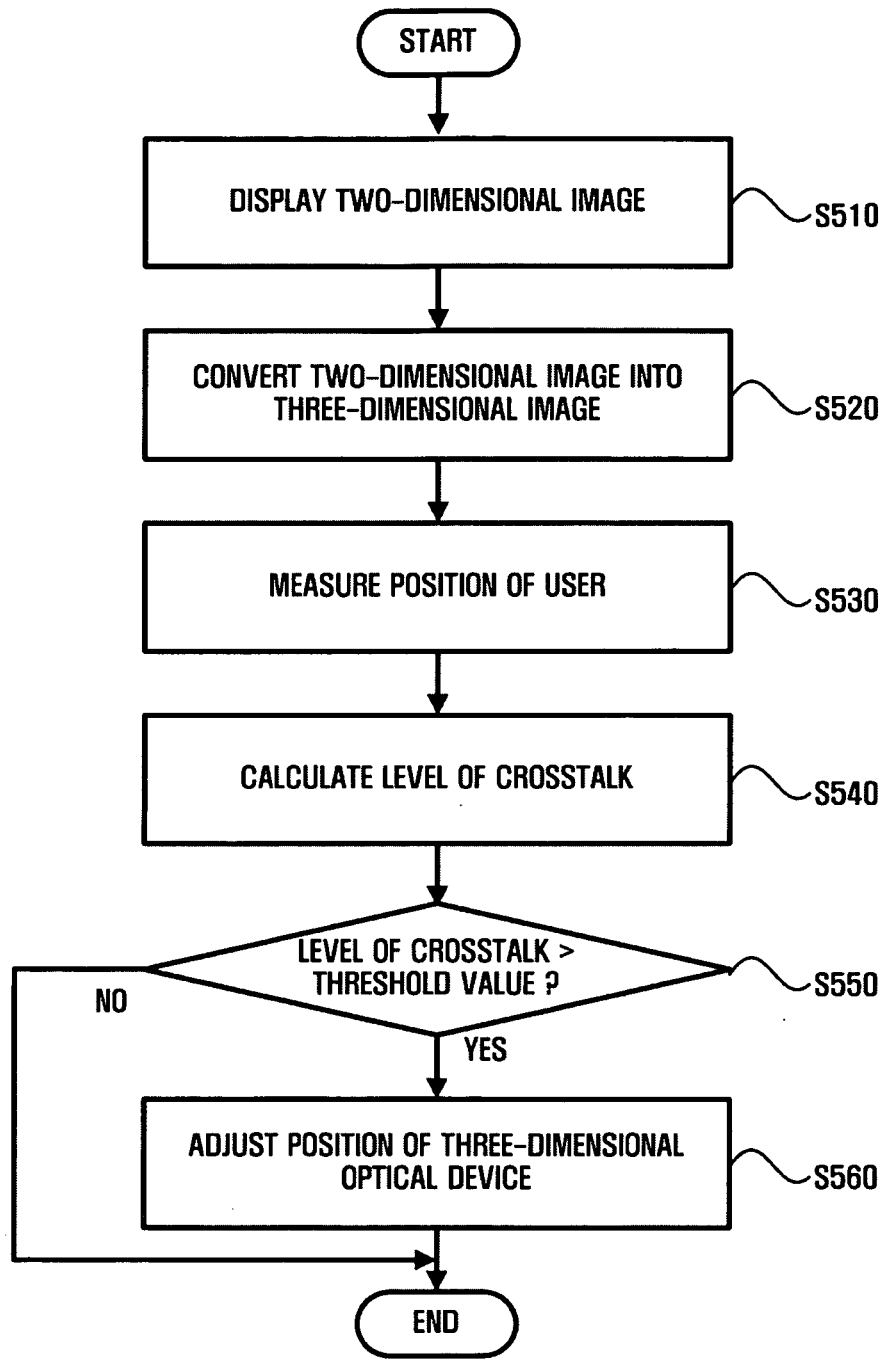

APPARATUS AND METHOD FOR DISPLAYING THREE-DIMENSIONAL IMAGE ACCORDING TO POSITION OF USER

CROSS-REFERENCE TO RELATED APPLICATION

This application is based on and claims priority from Korean Patent Application No. 10-2005-0125818, filed on Dec. 19, 2005 in the Korean Intellectual Property Office, the disclosure of which is incorporated herein in its entirety by reference.

BACKGROUND OF THE INVENTION

1. Field of the Invention

The present invention relates to an apparatus and method for displaying a three-dimensional image according to the position of a user and, more particularly, to an apparatus and method for displaying a three-dimensional image according to the position of a user, in which the distance between a display panel displaying a two-dimensional image and a three-dimensional optical panel converting a two-dimensional image into a three-dimensional image is controlled in accordance with the position of the user to provide an optimized three-dimensional image.

2. Description of the Related Art

With demands of users who desire to view images of improved picture quality, a digital TV has been developed. The digital TV provides improved picture quality and vivid images by adopting an aspect ratio different from that of an existing analog TV.

Picture quality is significant for a two-dimensional image whereas demands of users toward a three-dimensional image are recently increasing and studies of the three-dimensional image are being actively pursued.

Examples of a method of displaying a three-dimensional image include a glasses type method and a glasses-free type method. The glasses type method allows users to view three-dimensional images only if the users wear three-dimensional glasses while the glasses-free type method allows users to view three-dimensional images displayed in the screen without wearing the three-dimensional glasses. The glasses type is classified into a polarization type and a time-division type while the glasses-free type is classified into a parallax barrier type and a lenticular lens type.

Although existing three-dimensional image display systems have been developed in Japan, Europe, the United States of America, and others, for several years, their commercial use has been delayed due to visual fatigue and the inconvenience of wearing three-dimensional glasses.

Examples of visual fatigue generated in the three-dimensional image systems include accommodation-convergence breakdown and crosstalk.

The accommodation-convergence breakdown allows a user to recognize a three-dimensional depth without fatigue as accommodation-convergence is made when the user actually views an object. However, if the user views a three-dimensional image through the existing three-dimensional image system, accommodation-convergence breakdown occurs due to great disparity. In other words, eyes of the user focus on a plane of the screen while converging on a three-dimensional position created by the disparity on the screen, whereby discrepancy is caused.

Even though images having a depth exceeding a focal length of the user's eyes exist, they are displayed with definition, whereby such double images fatigue the user's eyes.

Crosstalk occurs as left and right images are not exactly delimited from each other in the three-dimensional image display system. Also, crosstalk occurs due to incomplete image conversion of the three-dimensional glasses or afterglow effect of a light-emitting factor on a monitor. Moreover, even though left and right images are exactly delimited from each other, their delimitation depends on the position of the user. In this case, crosstalk may still occur.

Unexamined Korean Patent Publication No. 2004-026693 discloses a display device including a three-dimensional image source, a disparity barrier arranged between the image source at one side and a lenticular lens at the other side, having a light-transmittive slit array for transmitting light beams to an array of lenticular lenses, and a control device controlling the slits of the disparity barrier to detect view point positions and vary an incident angle using a parameter value.

However, the slits of the parity barrier require delicate motion to display the three-dimensional image. It is not easy for the above related art to realize such delicate motion of the slits using an electric or magnetic method. Also, the above related art fails to disclose or describe motion of the slits. In this regard, a three-dimensional image display system is required, which can provide proper disparity according to a user's position.

SUMMARY OF THE INVENTION

Accordingly, the present invention has been made to solve the above-mentioned problems occurring in the prior art, and an aspect of the present invention is to provide an apparatus and method for displaying a three-dimensional image according to the position of a user, in which the distance between a display panel displaying a two-dimensional image and a three-dimensional optical panel converting a two-dimensional image into a three-dimensional image is controlled in accordance with the position of the user to provide an optimized three-dimensional image.

Another aspect of the present invention is to provide an apparatus and method for displaying a three-dimensional image according to a position of a user, in which a separate means displaying a three-dimensional image is provided in a conventional image display system to minimize the modification of the system.

Additional advantages, aspects and features of the invention will be set forth in part in the description which follows and in part will become apparent to those having ordinary skill in the art upon examination of the following or may be learned from practice of the invention.

In order to accomplish these aspects, there is provided an apparatus for displaying a three-dimensional image according to the position of a user. The apparatus includes a three-dimensional optical device converting a displayed two-dimensional image into a three-dimensional image, a position measurement module measuring the position of the user who converges on the three-dimensional image, a crosstalk calculator calculating the level of crosstalk that can occur in the position of the user, and a driver adjusting a position of the three-dimensional optical device if the level of crosstalk exceeds a predetermined threshold value.

In another aspect of the present invention, there is provided a method of displaying a three-dimensional image according to the position of a user. The method includes (a) converting a displayed two-dimensional image into a three-dimensional image through a three-dimensional optical device, (b) measuring the position of the user who converges on the three-dimensional image, (c) calculating the level of crosstalk that can occur in the position of the user, and (d) adjusting a position of the three-dimensional optical device if the level of crosstalk exceeds a predetermined threshold value.

BRIEF DESCRIPTION OF THE DRAWINGS

The above and other aspects, features and advantages of the present invention will be more apparent from the following detailed description taken in conjunction with the accompanying drawings, in which:

FIG. 4 is a table illustrating relation between the distance between a display device and a three-dimensional optical device and a position of a user according to the embodiment of the present invention;

FIG. 5 is a flowchart illustrating a method of displaying a three-dimensional image according to a position of a user according to the embodiment of the present invention.

DETAILED DESCRIPTION OF THE PREFERRED EMBODIMENTS

Figure 1:
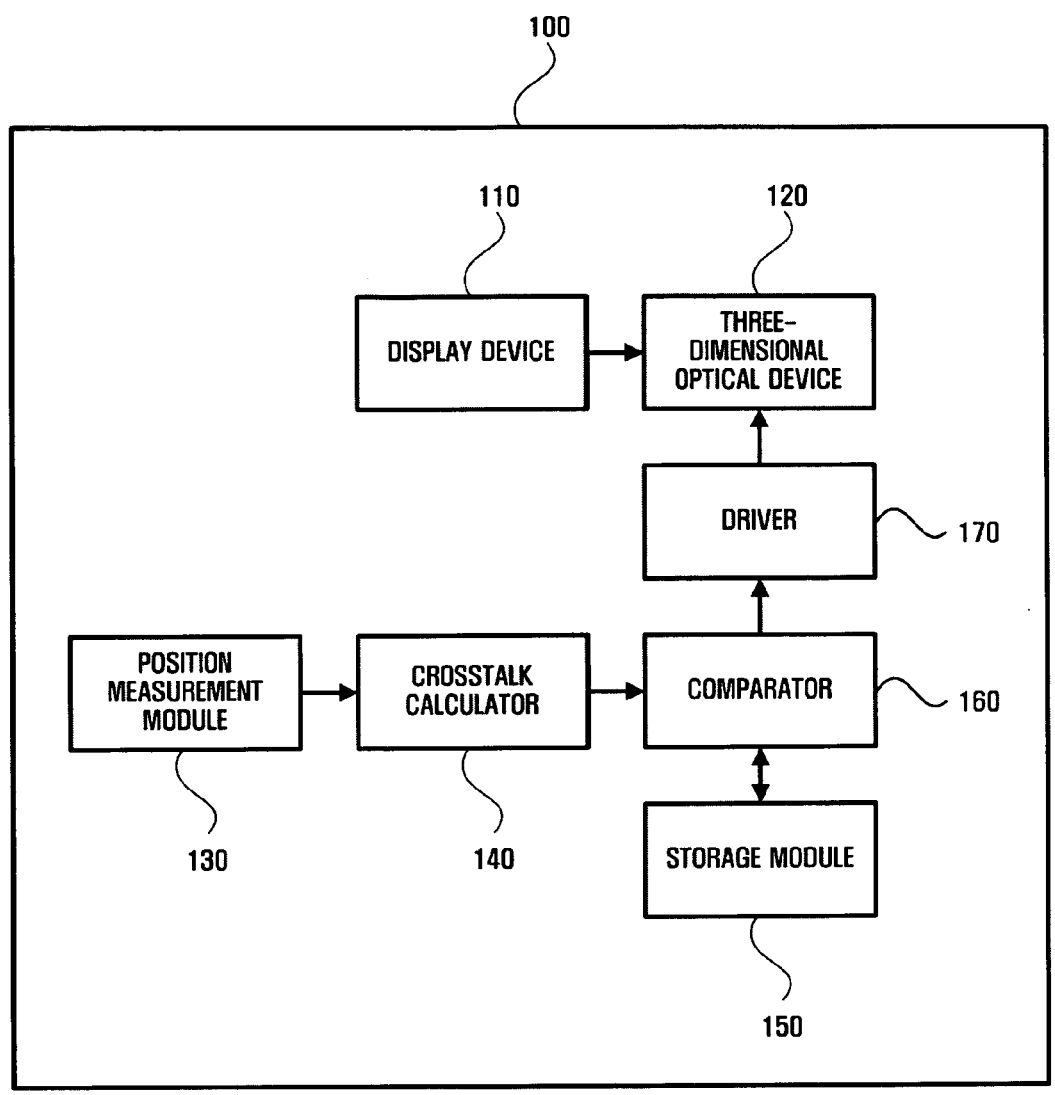
FIG. 1 is a block diagram illustrating an apparatus for displaying a three-dimensional image according to a position of a user according to the embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts for explaining an apparatus and method for displaying a three-dimensional image according to a position of a user according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram illustrating an apparatus for displaying a three-dimensional image according to a position of a user according to the embodiment of the present invention. Referring to FIG. 1, the apparatus for displaying a three-dimensional image according to a position of a user (hereinafter, referred to as a three-dimensional image apparatus) 100 includes a display device 110, a three-dimensional optical device 120, a position measurement module 130, a crosstalk calculator 140, a storage module 150, a comparator 160, and a driver 170.

The display device 110 serves to display a two-dimensional image. The two-dimensional image may be one that can be converted into a three-dimensional image, not a general two-dimensional image. The two-dimensional image includes a depth cue that can allow a user to recognize a three-dimensional depth using optical information of both eyes, such as binocular disparity and motion parallax.

Also, the two-dimensional image displayed by the display device 110 may include a depth cue that can allow a user to recognize a three-dimensional depth using a single eye. Examples of the depth cue using a single eye include light reflection, shade effect, a relative size in which a closer object is viewed in a large size, overlap between an object and another object, texture change in which a closer texture is viewed more clearly, spatial perspective in which an object located away is viewed dimly, and motion parallax and perspective in which a closer object is viewed like passing more quickly.

The display device 110 is a module provided with an image display means, which can display an input image signal, such as a cathode ray tube (CRT), a liquid crystal display (LCD), a light-emitting diode (LED), an organic light-emitting diode (OLED), or a plasma display panel (PDP). The display means 110 displays a two-dimensional image of the input image signal.

The two-dimensional image is transmitted to the three-dimensional optical device 120, so that the three-dimensional optical device 120 can convert the two-dimensional image into a three-dimensional image. In other words, the three-dimensional optical device 120 separates the displayed two-dimensional image into images for left and right eyes, wherein the image for the left eye is transmitted to the left eye and the image for the right eye is transmitted to the right eye, thereby allowing the user to feel the three-dimensional image.

The three-dimensional optical device 120 may be a parallax barrier type or a lenticular lens type.

In a parallax barrier sheet, slit-like openings are arranged side by side. In this case, if two images for both eyes or multi-images are alternately arranged on a rear side at a proper space, the user can view the three-dimensional image with the naked eye through the openings.

In a lenticular lenses sheet, small lenses are arranged to separate two images for both eyes or multi-images, thereby displaying the three-dimensional image. In this case, the user can view the three-dimensional image through the three-dimensional optical device 120 without wearing three-dimensional glasses.

The position measurement module 130 serves to measure the position of the user who converges on the three-dimensional image. In other words, the position measurement module 130 measures the distance between the three-dimensional image module 100 and the user, specifically the distance between the display device 110 and the user. In this case, the position measurement module 130 can measure the distance between the display device 110 and the user using at least one of a camera, infrared rays and ultrasonic waves.

The measured position of the user is transmitted to the crosstalk calculator 140. The crosstalk calculator 140 calculates the level of crosstalk that can occur in the user's position. Crosstalk occurs as the images for both eyes are not exactly separated from each other. The user may feel visual fatigue due to crosstalk.

Crosstalk depends on the distance between the display device 110 and the user. Also, crosstalk may depend on the size of the display device 110. Such crosstalk can be calculated by substituting the distance between the display device 110 and the user for a previously set function. Its calculation will be described later with reference to FIG. 3.

The calculated crosstalk is transmitted to the comparator 160. The comparator 160 compares the level of crosstalk with a predetermined threshold value. If the level of crosstalk does not exceed the threshold value, the comparator 160 disregards the transmitted crosstalk. If the level of crosstalk exceeds the threshold value, the comparator 160 transmits the user's position to the driver 170.

The driver 170 adjusts the position of the three-dimensional optical device 120 using the user's position transmitted from the comparator 160. In this case, the driver 170 adjusts the distance between the display device 110 and the three-dimensional optical device 120 with reference to at least one of the distance between the display device 110 and the user, a pixel pitch of the display device 110, and the user's binocular distance.

To this end, the driver 170 may include a driving means such as an electric motor, and moves the three-dimensional optical device 120 by applying electric or magnetic energy to the driving means.

The storage module 150 stores a table showing the relation between the distance between the display device 110 and the three-dimensional optical device 120 and the user's position, whereby the driver 170 can adjust the position of the three-dimensional optical device 120 with reference to the table.

The storage module 150 is a module, which enables input and output of information, such as a hard disk, a flash memory, a compact flash (CF) card, a secure digital (SD) card, a smart media (SM) card, a multimedia card, or a memory stick. The storage module 150 may be provided inside the three-dimensional image device 100 or may be provided in a separate device.

Figure 2:
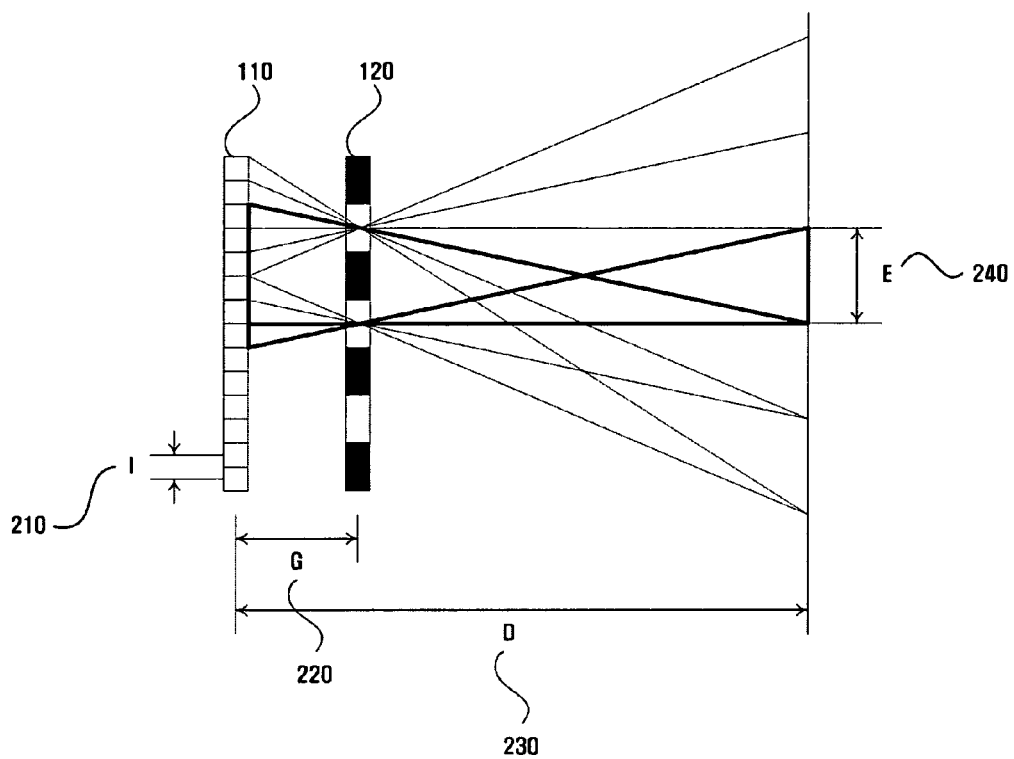
FIG. 2 is a view illustrating relation between a display device and a three-dimensional optical device according to the embodiment of the present invention.

FIG. 2 is a view illustrating the relation between the display device and the three-dimensional optical device 120 according to the embodiment of the present invention.

The three-dimensional image device 100 includes the display device 110 and the three-dimensional optical device 120. The display device 110 and the three-dimensional optical device 120 are arranged in parallel at a predetermined interval, so that the two-dimensional image displayed by the display device 110 is separated into images for both eyes through the three-dimensional optical device 120.

At this time, the distance G 220 between the display device 110 and the three-dimensional optical device 120 can be determined by the distance D 230 between the display device 110 and the user, a pixel pitch I 210 of the display device 110, and the user's binocular distance E 240. This can be expressed by Equation (1).

$$G:I = (D - G):E$$
$$G = \frac{I}{I + E}D \qquad (1)$$

Referring to Equation (1), the user's binocular distance 240 is in the range of 6.3 cm to 6.5 cm and can be regarded as a constant having a certain value. The pixel pitch 210 of the display device 110 is varied depending on the display device 110 but can be regarded as a constant. Accordingly, the distance 220 between the display device 110 and the three-dimensional optical device 120 can be determined by the distance 210 between the display device 110 and the user.

Figure 3:
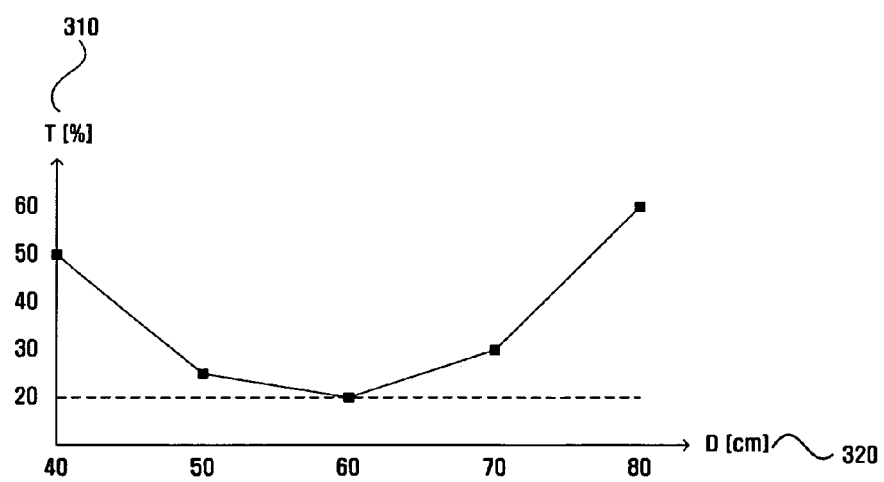
FIG. 3 is a graph illustrating the level of crosstalk according to the distance between a display device and a user according to the embodiment of the present invention.

FIG. 3 is a graph illustrating the level of crosstalk according to the distance between the display device and the user according to the embodiment of the present invention. The graph of FIG. 3 shows an experimental result obtained using separate crosstalk measurement equipment.

As shown in FIG. 3, it is noted that crosstalk 310 increases if the user is too close to the display device 110 or far away from the display device 110 around a specified position. In the present invention, the comparator 160 allows the driver 170 to move the three-dimensional optical device 120 if the level of the crosstalk 310, i.e., an incomplete level in separation of the images for both eyes, exceeds 20%.

The relation between the distance D 320 between the display device 110 and the user and the crosstalk T 310 can be expressed by Equation (2).

$$T = aD^2 + b \qquad (2)$$

Here, a and b are a coefficient and a constant, which are varied depending on the size of the display device 110 and the pixel pitch of the display device 110, and can be determined through the graph of FIG. 3 shown by experiment.

For example, if the size of the display device 110 is 15 inches and the pixel pitch is 0.261 mm, a=−0.0055 and b=38.8 are obtained. Also, if the size of the display device 110 is 55 inch and the pixel pitch is 0.81 mm, a=3.429×10$^{-6}$ and b=32.714 are obtained.

In other words, the crosstalk calculator 410 can calculate the crosstalk 310 according to the distance 320 using Equation (2).

Meanwhile, since I and E can be regarded as constants in Equation (1), G can be defined by Equation (3).

$$G = cD \qquad (3)$$

Here, c is a constant determined by I and E. For example, if the pixel pitch I of the display device 110 is 0.261 mm and the user's binocular distance E is 6.5 cm, c is equal to 0.004. Also, if the pixel pitch I of the display device 110 is 0.81 mm and the user's binocular distance E is 6.5 cm, c is equal to 0.0123.

FIG. 4 is a table illustrating the relation between the distance G between the display device and the three-dimensional optical device and the user's position D. The table of FIG. 4 can be determined by Equation (3) and can be stored in the storage module 150.

In other words, if the crosstalk calculated by the crosstalk calculator 140 exceeds 20%, the driver 170 adjusts the distance between the display device 110 and the three-dimensional optical device 120 using tables 410 and 420 stored in the storage module 150.

Furthermore, the tables 410 and 420 include the relation between G and D corresponding to the size and the pixel pitch of the display device 110. The driver 170 moves the three-dimensional optical device 120 using the relation between G and D with reference to the size and the pixel pitch of the display device 110.

For example, if the size and the pixel pitch of the display device 110 are 15 inches and 0.261 mm, respectively, and D is 600 mm, the driver 170 extracts G of 2.4 mm using the table 410 and adjusts the distance between the display device 110 and the three-dimensional optical device 120 to reach 2.4 mm.

Meanwhile, if the size and the pixel pitch of the display device 110 are 55 inches and 0.81 mm, respectively, and D is 1500 mm, the driver 170 extracts G of 18.462 mm using the table 420 and adjusts the distance between the display device 110 and the three-dimensional optical device 120 to reach 18.462 mm.

FIG. 5 is a flowchart illustrating a method of displaying a three-dimensional image according to the user's position according to the embodiment of the present invention. First, the display device 110 of the three-dimensional image device 100 displays the two-dimensional image S510.

The two-dimensional image displayed by the display device 110 includes cues, which can recognize the three-dimensional depth, wherein examples of the cues include binocular disparity, motion parallax, light reflection, shade effect, a relative size in which a closer object is viewed in a large size, overlap between an object and another object, texture change in which a closer texture is viewed more clearly, spatial perspective in which an object located far away is viewed dimly, and motion parallax and perspective in which a closer object is viewed as passing more quickly.

The two-dimensional image is transmitted to the three-dimensional optical device 120, and the three-dimensional optical device 120 converts the two-dimensional image into the three-dimensional image. S520. At this time, the three-dimensional optical device 120 can perform image conversion using the parallax barrier sheet or the lenticular lens sheet.

The three-dimensional image displayed by the three-dimensional optical device 120 is observed by the user. The position measurement module 130 measures the user's position S530. In this case, the user's position is the distance between the display device 110 and the user. The position measurement module 130 measures the distance between the display device 110 and the user using at least one of a camera, infrared rays and ultrasonic waves.

The distance measured by the position measurement module 130 is transmitted to the crosstalk calculator 140. The crosstalk calculator 140 calculates the level of crosstalk that can occur in the measured position of the user S540. The level of crosstalk can be calculated by Equation (2). In other words, the crosstalk calculator 140 calculates crosstalk using the pixel pitch of the display device 110, the user's binocular distance and the distance between the display device 110 and the user.

The calculated crosstalk is transmitted to the comparator 160. The comparator 160 compares the level of the crosstalk with a predetermined threshold value S550. In this case, the threshold value can be set to about 20%, and the set threshold value can be reset by the user.

As a result of comparison, if the level of the crosstalk does not exceed the threshold value, the comparator 160 disregards the transmitted crosstalk. If the level of crosstalk exceeds the threshold value, the comparator 160 transmits the user's position to the driver 170.

Then, the driver 170 adjusts the position of the three-dimensional optical device 120 using the user's position transmitted from the comparator 160 S560. That is to say, the driver 170 adjusts the distance between the display device 110 and the three-dimensional optical device 120 using Equation (1) or (3).

Meanwhile, the driver 170 can adjust the distance between the display device 110 and the three-dimensional optical device 120 with reference to the table prepared by using Equation (1) or (3). That is, the position of the three-dimensional optical device 120 can be adjusted through the distance between the display device 110 and the three-dimensional optical device 120 that is stored corresponding to the user's position.

Figure 6:
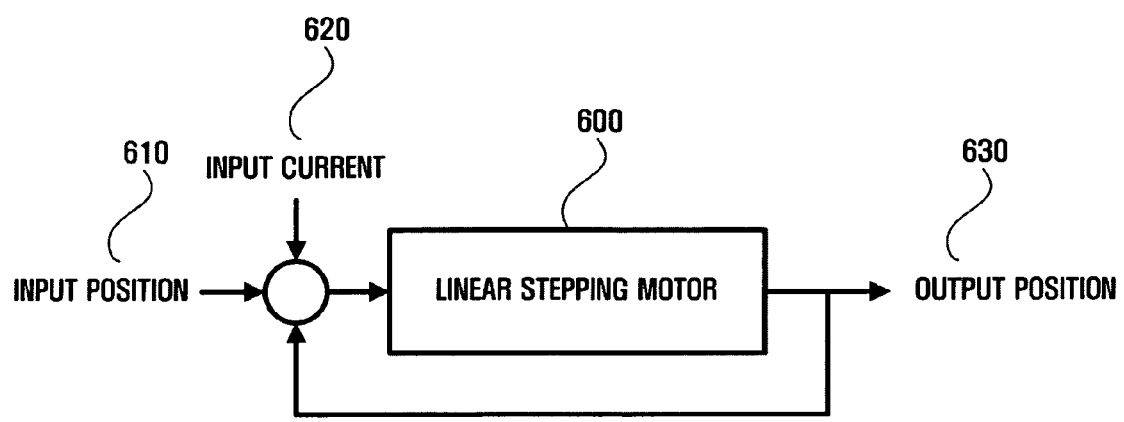
FIG. 6 is a view illustrating a driving manner of a driver according to the embodiment of the present invention.

FIG. 6 is a view illustrating a driving manner of the driver according to the embodiment of the present invention. Referring to FIG. 6, the driver 170 adjusts the distance between the display device 110 and the three-dimensional optical device 120 using a feedback control method.

A linear stepping motor 600 that enables accurate position control can be used as the driving means of the driver 170. If an input current 620 and an input position 610 are input to the linear stepping motor 600, the linear stepping motor 600 is driven by the input current 620 and the input position 610 and feeds back the driven result, i.e., an output position 630. The feedback output position 630 is compared with the input position 610, and the linear stepping motor 600 is driven until the input position 610 is equal to the output position 630.

Constant voltage control can be used to accelerate driving of the linear stepping motor 600 while constant current control can be used to decelerate driving of the linear stepping motor 600.

As described above, the apparatus and method for displaying a three-dimensional image according to a position of a user according to the present invention has the following advantages.

First, since the distance between the display panel displaying the two-dimensional image and the three-dimensional optical panel converting the two-dimensional image into the three-dimensional image is controlled in accordance with the position of the user, it is possible to easily reduce crosstalk.

In addition, since a separate means for displaying the three-dimensional image is added to the related art image display system, it is possible to minimize modification of the system and reduce the cost.

The preferred embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for displaying a three-dimensional image according to the position of a user, comprising:
   a three-dimensional optical device converting a displayed two-dimensional image into a three-dimensional image;
   a position measurement module measuring the position of the user who converges on the three-dimensional image;
   a crosstalk calculator calculating a level of crosstalk that can occur in the position of the user, wherein the level of crosstalk is calculated according to the square of a distance between the user and a display device displaying the two-dimensional image; and
   a driver adjusting a position of the three-dimensional optical device if the level of crosstalk exceeds a predetermined threshold value,
   wherein the driver adjusts the distance between the display device and the three-dimensional optical device with reference to the distance between the display device and the user, a pixel pitch of the display device, and the user's binocular distance.

2. The apparatus of claim 1, wherein the position measurement module measures the distance between the display device and the user.

3. The apparatus of claim 1, wherein the distance between the display device and the three-dimensional optical device, G, is calculated through an equation $$G = \frac{I}{I+E}D,$$

wherein D is the distance between the display device and the user, I is the pixel pitch of the display device, and E is the user's binocular distance.

4. The apparatus of claim 1, wherein the level of crosstalk is calculated through an equation $aD^2 + b$, wherein D is the distance between the display device and the user, and a and b are constants determined through an experiment in accordance with the size and the pixel pitch of the display device.

5. The apparatus of claim 1, wherein the three dimensional optical device separates the displayed two-dimensional image into images for left and right eyes by letting the two-dimensional image pass through a screen.

6. The apparatus of claim 1, wherein the position measurement module measures the position of the user using at least one of a camera, infrared rays and ultrasonic waves.

7. The apparatus of claim 1, wherein the three-dimensional optical device is of a parallax barrier type or a lenticular lens type.

8. The apparatus of claim 1, wherein the driver includes a linear stepping motor.

9. A method of displaying a three-dimensional image according to the position of a user, comprising:
   (a) converting a displayed two-dimensional image into a three-dimensional image through a three-dimensional optical device;
   (b) measuring the position of the user who converges on the three-dimensional image;
   (c) calculating a level of crosstalk that can occur in the position of the user, wherein the level of crosstalk is calculated according to the square of a distance between the user and a display device displaying the two-dimensional image;
   (d) adjusting a position of the three-dimensional optical device if the level of crosstalk exceeds a predetermined threshold value; and
   (e) displaying the two-dimensional image through the display device,
   wherein (d) includes adjusting the distance between the display device and the three-dimensional optical device with reference to the distance between the display device and the user, a pixel pitch of the display device, and the user's binocular distance.

10. The method of claim 9, wherein (b) includes measuring the distance between the display device and the user.

11. The method of claim 9, wherein the distance between the display device and the three-dimensional optical device, G, is calculated through an equation $$G = \frac{I}{I+E}D,$$

where D is the distance between the display device and the user, I is the pixel pitch of the display device, and E is the user's binocular distance.

12. The method of claim 9, wherein the level of crosstalk is calculated through an equation $aD^2 + b$, where D is the distance between the display device and the user, and a and b are constants determined through an experiment in accordance with the size and the pixel pitch of the display device.

13. The method of claim 9, wherein (b) includes measuring the position of the user using at least one of a camera, infrared rays and ultrasonic waves.

14. The method of claim 9, wherein (a) includes separating the displayed two-dimensional image into images for left and right eyes by letting the two-dimensional image pass through a screen.

15. The method of claim 14, wherein (a) includes separating the displayed two-dimensional image into images for left and right eyes using at least one of a parallax barrier or a lenticular lens.

16. The method of claim 9, wherein (d) includes adjusting the position of the three-dimensional optical device using a linear stepping motor.

* * * * *